United States Patent [19]

Heimala et al.

[11] 4,393,029
[45] Jul. 12, 1983

[54] PROCESS FOR THE PRODUCTION OF AN IRON-FREE CHRONIUM (III) COMPOUND

[75] Inventors: Seppo O. Heimala; Stig E. Hultholm, both of Pori; Frans H. Tuovinen, Ulvila, all of Finland

[73] Assignee: Outokumpu Oy, Helsinki, Finland

[21] Appl. No.: 286,038

[22] Filed: Jul. 22, 1981

[30] Foreign Application Priority Data

Aug. 5, 1980 [FI] Finland .................................. 802445

[51] Int. Cl.³ ............................................ C01G 37/00
[52] U.S. Cl. ........................................ 423/55; 423/53
[58] Field of Search ..................... 423/53, 55

[56] References Cited

U.S. PATENT DOCUMENTS

| | | | |
|---|---|---|---|
| 3,896,209 | 7/1975 | Fournier et al. .............. | 423/607 |
| 3,961,029 | 6/1976 | Senoo ............................. | 423/55 |
| 4,086,150 | 4/1978 | Kindl et al. ................... | 423/607 |
| 4,108,596 | 8/1978 | Hemming et al. ........... | 423/55 |
| 4,168,240 | 9/1979 | Bockelmann et al. ........ | 423/55 |
| 4,207,295 | 6/1980 | Kagetsu et al. ............... | 423/55 |
| 4,259,297 | 3/1981 | Kaczur et al. ................ | 423/55 |

FOREIGN PATENT DOCUMENTS

| | | | |
|---|---|---|---|
| 3004174 | 8/1980 | Fed. Rep. of Germany ........ | 423/55 |
| 47-17697 | 9/1972 | Japan ............................ | 423/55 |
| 204886 | 10/1923 | United Kingdom ........... | 423/55 |
| 2042489 | 9/1980 | United Kingdom ........... | 423/55 |

*Primary Examiner*—Herbert T. Carter
*Attorney, Agent, or Firm*—Brooks, Haidt, Haffner & Delahunty

[57] ABSTRACT

An iron-free chromium(III) compound is precipitated at an elevated temperature and pressure from an acidic aqueous solution which contains iron and chromium. In order to prevent coprecipitation of iron, an additive is added to the precipitation stage in an amount sufficient to provide in the precipitation conditions at least 2 g/l of bivalent chromium in the solution.

4 Claims, 3 Drawing Figures

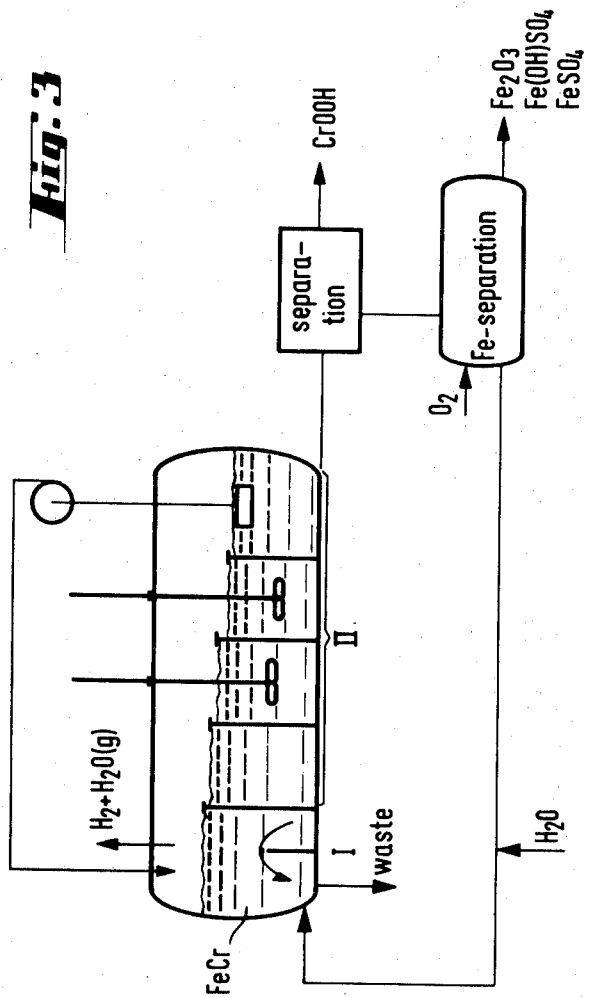

PROCESS FOR THE PRODUCTION OF AN IRON-FREE CHRONIUM (III) COMPOUND

BACKGROUND OF THE INVENTION

The present invention relates to a process for the precipitation of a substantially iron-free chromium(III) compound at an elevated temperature and pressure from an acidic aqueous solution which contains iron and chromium.

Chromium chemicals are nowadays produced industrially only from chromite or ferrochromium by means of oxidizing calcination. Alkalic chromate is separated from the calcinated product by leaching it in water, and after several purification and washing stages, dichromate conversion is carried out using sodium bisulfate derived from the production of chromium trioxide, sulfuric acid, carbon dioxide or the like. Other chromium salts, such as chromates of potassium, ammonium, zinc and lead, chromium trioxide, $Cr_2O_3$, $Cr(OH)Cl_2$, $CrO_2$, etc., and metallic chromium are also obtained from the purified alkali chromate solution directly or by a suitable treatment of alkali dichromate.

The previously known methods are both complicated and expensive. Since hexavalent chromium is toxic, these prior known processes have always involved environmental and health hazards.

The object of the present invention is to eliminate the above-mentioned disadvantages and to provide a process for the precipitation of a substantially iron-free chromium(III) compound, without coprecipitation of iron, at an elevated temperature and pressure from an acidic aqueous solution which contains iron and chromium. In the process according to the invention, the raw material used can be chromium-low or chromium-high chromite, ferrochromium, chromium-bearing scrap, etc.

SUMMARY OF THE INVENTION

In the process according to the invention the coprecipitation of iron is prevented by adding to the precipitation stage an additive in an amount sufficient to provide under the precipitation conditions at least 2 g/l of bivalent chromium in the solution. The additive may at the same time serve as a neutralizing agent, neutralizing the acid present in the solution.

Finely-ground and advantageously pulverous zinc, iron, chromium, manganese or mixtures of these, preferably ferrochromium, or carbides are usable additives. The additive can also be magnesium oxide and/or carbonate.

The precipitation is discontinued preferably when the solution still contains bi- or trivalent chromium about 5-20 g/l.

When finely-divided zinc and/or iron is used as the additive, it is advantageous to regenerate to elemental form by electrolytic reduction the zinc and/or iron which has dissolved during the precipitation stage. This can be carried out, for example, by crystallizing out the compounds of zinc and/or iron from the solution separated from the precipitated chromium(III) compound, by leaching the crystals of compounds of zinc and/or iron, and by reducing them to their elemental form electrolytically, whereafter the zinc and/or iron can be returned to the precipitation stage of the chromium(III) compound. Direct feed of the CrOOH filtrate to electrolysis, without crystallization, is also possible in principle.

The Cr compound is preferably precipitated out, by means of an additive, from a solution the pH of which is maintained at a value of at least 0.5, e.g. at 1.5–2.2, and the temperature of which is preferably about 110°–300° C., e.g. 200°–250° C.

The acidic aqueous solution used as the initial substance can be produced by leaching an iron-bearing chromium raw material, such as ferrochromium or chromite, in an acid, preferably sulfuric acid or hydrochloric acid, or in the cycled acid solution regenerated during the precipitation of the chromium(III) compound.

Depending on the raw material used, the initial stages of the process can vary greatly. For example, $SiO_2$, calcium, sulfate, sulfite, bivalent nickel, trivalent aluminum, etc., can be separated during the pretreatment stages. The use of the so-called low-valence processes has been prevented by the great difficulty of separating iron and chromium in particular from each other. This difficulty has now been overcome by the process according to the present invention and by using in the precipitation conditions an external reagent which forms bivalent chromium and advantageously at the same time neutralizes the acid. This is achieved by carrying out the precipitation from a solution in which a concentration of bivalent chromium of at least 2 g/l is maintained by means of the same additive and which preferably contains trivalent chromium at least about 70–90 g/l. By this procedure, it is possible to precipitate chromium as chromium oxyhydrate, without the coprecipitation of iron in the final product. At the same time, part of the combined acid can be regenerated and returned to the initial stages of the process. The concentration of iron in the cycled solution is maintained at a suitable level, e.g. between about 40 and 70 g/l iron, by crystallizing out iron sulfate from the solution or by hydrolyzing the solution at an elevated temperature. The precipitation temperature of CrOOH depends on the concentration of hydrochloric acid in the solution. The upper temperature limit for pure sulfate is 250° C., but if hydrochloric acid is present, this upper temperature limit is higher.

The upper temperature limit is due to the fact that the precipitating iron compound is no longer water-soluble above this temperature. It is also evident that the treatment temperature must not be too low, since in that case the advantage of the regeneration of the acid is lost, not to speak of a decreased yield of the product.

The solution containing iron and chromium, used in the process according to the invention, can be made from chromite. When metallic chromium or chromium oxide intended for use in dyes is produced, the initial solution may also contain aluminum, since the precipitating jarosite-type aluminum sulfate decomposes during calcination. In this manner, the color tone of the chromium oxide obtained can be regulated. When metallic chromium is produced aluminothermally, a small amount of aluminum oxide in the chromium oxide is, however, not harmful.

DESCRIPTION OF THE DRAWINGS

FIG. 3 depicts the process in its simplest form, in which the leaching and the precipitation are carried out in the same autoclave. In order to prevent short circuits, partition walls are used for the solution and the solid. The passage of the solution from one stage to another is by overflow.

DESCRIPTION OF THE PREFERRED EMBODIMENTS

Suitable additives in the present invention have proved to be, for example, Zn, Fe, Cr and Mn metals (powders), and of course mixtures of the same, carbides, etc. For example, chromium is added preferably as a rather coarse ferrochromium powder, so that it can be separated afterwards mechanically from CrOOH because of impurities such as silicon. The additive used can also be MgO and MgCO$_3$, i.e. substances which do not form alkalic sulfates with Cr$^{3+}$. Thus, for example, NH$_4^+$, K$^+$ or Na$^+$ ions cannot be used.

The upper limit of the feed of the neutralizing agent is determined by the acid equivalent of the following reaction (1):

$$Cr_2(SO_4)_3 \xrightarrow{H_2O} 2CrOOH + 3H_2SO_4 \quad (1)$$

If elemental iron (Fe$^o$) is fed to this in an amount higher than the amount which the formed H$_2$SO$_4$ can combine, the produced CrOOH product is contaminated in the above-mentioned case by, for example, alkalic Fe$^{2+}$ compounds. However, cost factors also limit the feed of elemental iron to a level of about 10–50 g/l.

The third limitation on the use of additives is the total solubility of the salts, which is of the order of 4–5 mol/l (Fe$^{2+}$ + Cr$^{3+}$ + Zn$^{2+}$ + Cr$^{2+}$, Mg$^{2+}$, etc.).

Figure 1:
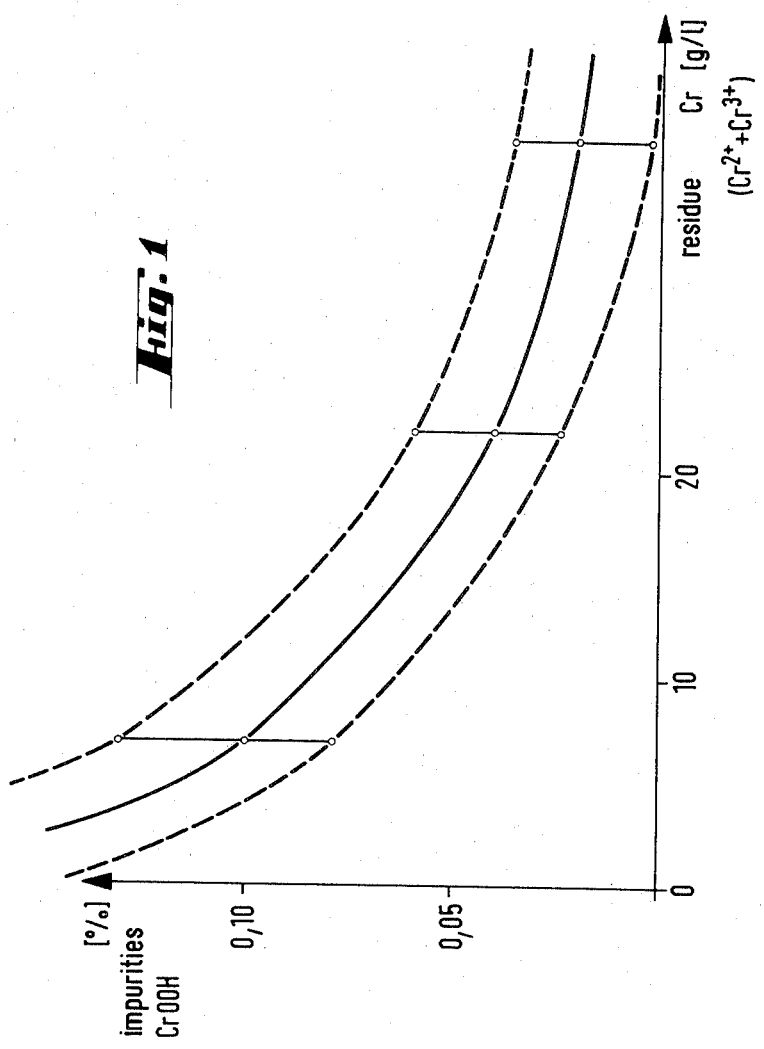
FIG. 1 depicts the dependence of the amount (in percent) of impurities present in the precipitated chromium(III) compound on the amount of bi- and trivalent chromium (g/l) remaining in the solution.

It has been observed in experiments that, because of the quality factors of CrOOH, primarily purity, it is advisable to leave a small amount, 2–20 g/l, of Cr$^{3+}$ + Cr$^{2+}$ unprecipitated in the solution. This is illustrated in FIG. 1. The curve can shift between the dotted lines, depending on the conditions.

The curve (basic curve) according to FIG. 1 was obtained in the following conditions: The solution was kept for two hours at a temperature of 230° C. The amount of trivalent chromium at the initial moment was 92 g/l. The formation of Cr$^{2+}$ and the neutralization of the acid produced was carried out by means of zinc iron powder. If all of the Cr$^{3+}$ is precipitated, zinc/iron powder has been used at about 35 g/l, and if the residual Cr$^{3+}$ is about 35 g/l, no zinc/iron powder has been used.

Experiments have shown that the yield of CrOOH increases initially in almost direct proportion to the amount of additive.

The selection of the additive depends on which additive is the most advantageous and expedient in a given case. In principle, the most advantageous is ferrochromium used as a rather coarse powder. The use of this increases the costs only slightly. When powder of zinc and iron is used for CrOOH precipitation, the system must include an electrolytic or other reduction system which reconverts to elemental form the bivalent iron and zinc produced during the precipitation process: FeSO$_4$ + C → Fe$^o$ + SO$_2$ + CO$_2$. When the additive used is magnesium oxide, there is then usually inexpensive magnesium oxide or carbonate available, or the produced magnesium sulfate can advantageously be used as a fertilizer.

The conditions, such as the temperature, retention time, etc., of CrOOH precipitation are approximately the same as those mentioned in Finnish Patent specification No. 60381, granted Jan. 11, 1982 (Pat. Application No. 790391).

Figure 2:
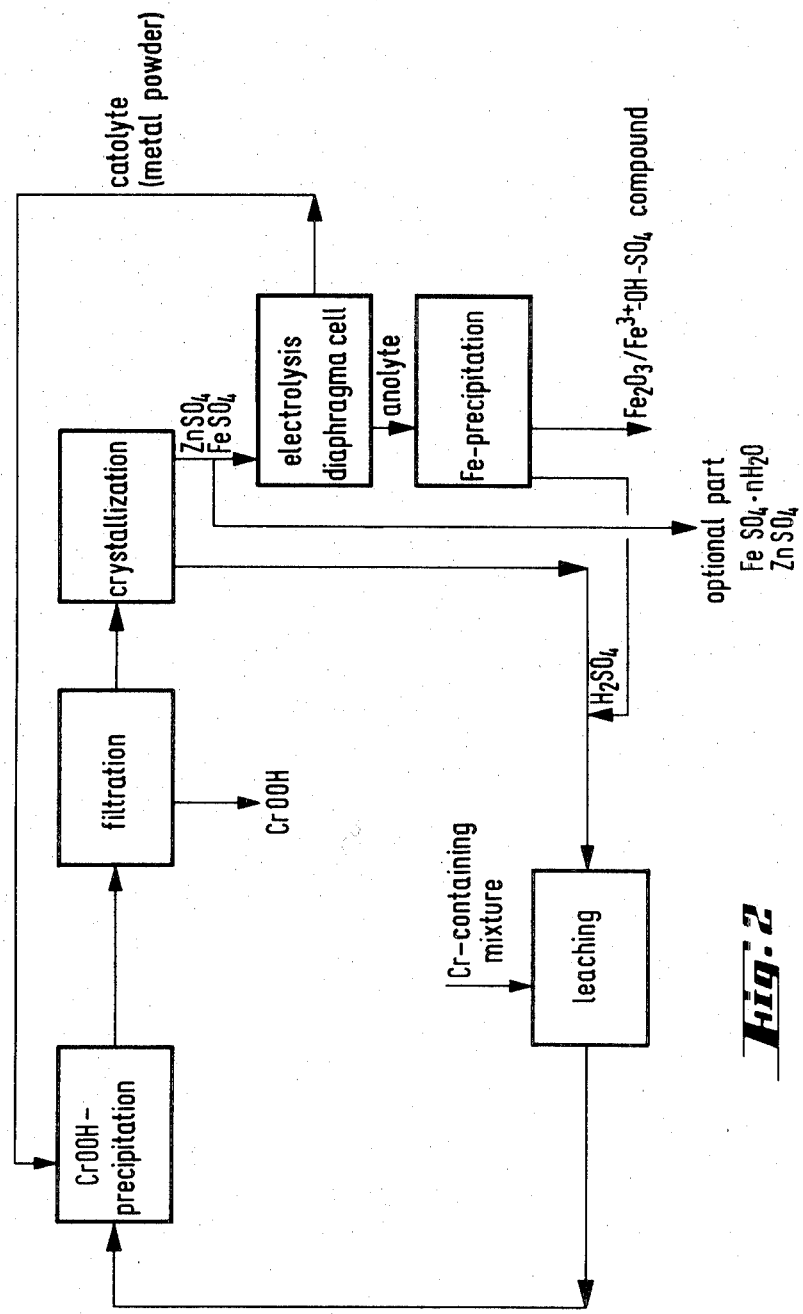
FIG. 2 depicts one advantageous flow diagram for carrying out the process according to the invention.

FIG. 2 depicts a diagram of the process in a case in which iron and/or zinc is used as the additive. In this case, the following reactions occur at the electrodes:

At the anode: Fe$^{2+}$ → Fe$^{3+}$

At the cathode: Zn$^{2+}$, Fe$^{2+}$ → Zn$^o$, Fe$^o$

The current available for the electrolysis is 95–70% in regard to reactions Me$^{n+}$ + ne$^-$ → Me$^o$.

The simplest variant of our process is one in which the leaching of a Cr raw material (ferrochromium) and the precipitation of CrOOH are carried out in the same vessel (autoclave). It is natural that in this case the retention time of the solution in the leaching section (n×minute) must not be too long, so that Cr$^{2+}$ will not have time to oxidize to Cr$^{3+}$, and the Cr$^{3+}$ compound will not have time to precipitate on the surfaces. The leaching can be promoted chemically or also electrochemically, in which case the anode potential must be sufficiently low considering the Cr$^{2+}$/Cr$^{3+}$. After the leaching-precipitation stage there is, of course, only the separation of Fe$^{2+}$ (in addition to other secondary elements) from the cycled solution and the returning of the solution to the beginning. The Fe is separated in this variant as either a Fe$^{2+}$ or a Fe$^{3+}$ compound (FeSO$_4$, jarosite, Fe$_2$O$_3$, etc.).

EXAMPLE 1

A solution, pH 2.1, which contained 47 g/l Fe$^{2+}$ and 14 g/l Zn$^{2+}$, and 4 g/l Cr$^{2+}$, 81 g/l Cr$^{3+}$, was maintained at 235° C. in a H$_2$ atmosphere for 90 minutes, adding to it in four batches a total of 20 g/l Zn powder, which contained iron about 2.5%. The yield of CrOOH was 87% and the concentration of Fe in the product after the washes was 0.02%.

EXAMPLE 2

In order to explain the process according to the scheme in the appendix, finely-divided ferrochromium was leached (I) in a cycled solution which contained available H$_2$SO$_4$ 52 g/l, at 225° C. with a short retention time, and the obtained solution was kept separate in the same vessel (II) at 230° C., and the obtained CrOOH mother liquor at 230° C. was recycled to the leach. The concentration of Fe in the obtained CrOOH precipitate was 0.06% and the concentration of iron in the mother liquor at the end of the experiment (3 h) was about 125 g/l.

What is claimed is:

1. A process for the leaching of a chromium raw material and the precipitation of a substantially iron-free chromium (III) compound at an elevated temperature and pressure from an acidic aqueous solution which contains iron and chromium, comprising leaching the chromium raw material and precipitating the chromium compound substantially in the same autoclave vessel, which vessel has leaching and precipitation zones separated from each other only by partition walls, whereby solution can pass from one zone to another zone by overflowing said walls; adding a finely divided additive selected from the group consisting of zinc, iron, chromium, manganese and a mixture of two or more members of the group to the precipitation zone in an amount sufficient to provide at least 2 g/l of bivalent chromium in the solution and to neutralize the acid present in the solution, the precipitation being carried out at a pH between 0.5 and 2.2 by addition of the additive and the temperature being from about 110° to 300° C., whereby the pressure is that which results from treating said solution at such temperature in an autoclave.

2. A process according to claim 1, in which the precipitation is discontinued when bi- or trivalent chromium still remains in the solution in an amount of about 5-20 g/l.

3. A process according to claim 1, in which finely-divided zinc and/or iron is added to the precipitation zone, comprising regenerating the zinc or iron or both dissolved in the precipitation zone in elemental form by reducing electrolytically the zinc or iron compounds or both separated from the precipitated chromium(III) compound before they are returned to the precipitation zone.

4. A process according to claim 1, in which the pH of the solution is controlled to about 1.5 to 2.2 and the temperature is about 200° to 250° C.

* * * * *